(12) United States Patent
Taylor et al.

(10) Patent No.: US 10,100,814 B1
(45) Date of Patent: Oct. 16, 2018

(54) ENERGY HARVESTING WIND SENSOR

(71) Applicant: Dometic Sweden AB, Solna (SE)

(72) Inventors: Brent A. Taylor, Auburn, IN (US);
Andre Villemaire, Quebec (CA)

(73) Assignee: Dometic Sweden AB, Solna (SE)

( * ) Notice: Subject to any disclaimer, the term of this patent is extended or adjusted under 35 U.S.C. 154(b) by 126 days.

(21) Appl. No.: 15/204,769

(22) Filed: Jul. 7, 2016

Related U.S. Application Data

(60) Provisional application No. 62/190,061, filed on Jul. 8, 2015.

(51) Int. Cl.
| | |
|---|---|
| *G01W 1/00* | (2006.01) |
| *F03D 9/00* | (2016.01) |
| *F03D 9/32* | (2016.01) |
| *B60P 3/36* | (2006.01) |
| *H02K 35/02* | (2006.01) |
| *E04H 15/08* | (2006.01) |

(52) U.S. Cl.
CPC ............. *F03D 9/002* (2013.01); *B60P 3/36* (2013.01); *E04H 15/08* (2013.01); *F03D 9/32* (2016.05); *G01W 1/00* (2013.01); *H02K 35/02* (2013.01)

(58) Field of Classification Search
None
See application file for complete search history.

(56) References Cited

U.S. PATENT DOCUMENTS

| | | | |
|---|---|---|---|
| 5,225,748 A * | 7/1993 | Haring ................ | E06B 9/32 160/1 |
| 6,484,069 B2 | 11/2002 | Osinga | |
| 6,798,158 B2 | 9/2004 | Evans | |
| 7,207,217 B2 | 4/2007 | Orsat | |
| 7,242,162 B2 | 7/2007 | Goth | |
| 7,389,806 B2 | 6/2008 | Kates | |
| 7,729,807 B2 | 6/2010 | Guillemot et al. | |
| 8,104,491 B2 | 1/2012 | Li | |
| 8,106,768 B2 | 1/2012 | Neumann | |
| 8,179,062 B2 | 5/2012 | Germain et al. | |
| 8,261,608 B2 | 9/2012 | Schoen | |
| 8,424,378 B2 | 4/2013 | Mugnier et al. | |
| 8,441,152 B2 | 5/2013 | Tai et al. | |
| 8,887,785 B2 | 11/2014 | Goth | |
| 9,746,488 B2 * | 8/2017 | Kriwan ................ | G01P 13/006 |

(Continued)

FOREIGN PATENT DOCUMENTS

EP   1712882   10/2006

OTHER PUBLICATIONS

Fei et al., "A wind-flutter energy converter for powering wireless sensors", Sensors and Actuators A: Physical vol. 173, Issue 1, Jan. 2012, pp. 163-171 Jan. 1, 2012.

(Continued)

*Primary Examiner* — Andre Allen
(74) *Attorney, Agent, or Firm* — Middleton Reutlinger

(57) ABSTRACT

An energy harvesting wind sensor is provided for an awning assembly. The device is self-powering in that energy is converted from wind to electrical in order to power the sensor and a transmitter which signals a receiver to retract the awning assembly if a preselected threshold is met or exceeded. Since the system converts wind energy to electrical energy, wiring is not needed to extend along the moving or rotating parts of the awning assembly.

19 Claims, 8 Drawing Sheets

(56) References Cited

U.S. PATENT DOCUMENTS

| | | | |
|---|---|---|---|
| 2001/0027846 A1* | 10/2001 | Osinga | E04F 10/0659 160/70 |
| 2004/0075411 A1* | 4/2004 | Evans | E04F 10/0659 318/481 |
| 2007/0240831 A1* | 10/2007 | Tran | B60P 3/343 160/67 |
| 2009/0125148 A1 | 5/2009 | Koot et al. | |
| 2009/0245151 A1 | 10/2009 | Augustin et al. | |
| 2010/0252208 A1* | 10/2010 | Svirsky | E04F 10/10 160/61 |
| 2011/0198041 A1* | 8/2011 | Svirsky | E04F 10/10 160/61 |

OTHER PUBLICATIONS

Weimer, "Remote area wind energy harvesting for low-power autonomous sensors", power Electronics Specialists Conference, 2006. PESC '06. 37th IEEE Jun. 18, 2006.

\* cited by examiner

ENERGY HARVESTING WIND SENSOR

CLAIM TO PRIORITY

This non-provisional patent application claims priority to and benefit of, under 35 U.S.C. § 119(e), U.S. Provisional Patent Application Ser. No. 62/190,061, filed Jul. 8, 2015 and titled "Energy Harvesting Wind Sensor", all of which is incorporated by reference herein.

BACKGROUND

Field of the Invention

Present embodiments pertain to a wind sensor for an awning assembly. More particularly, present embodiments relate to, without limitation, a wind sensor which converts energy from the wind in order to power the wind sensor and power a control signal.

Description of the Related Art

The use of awnings on recreational vehicles, mobile homes, marine craft and fixed structures, for example on homes, has increased in part due to a desire to increase the functionality of outdoor living spaces. Due to the size and weight of awning assemblies, there is a need to ensure that the structures are not damaged or fail due to environmental conditions, for example wind. The use of these outdoor living spaces, therefore has created a necessity to monitor environmental conditions such that the use of the awning assembly is safe.

For example, it is desirable that when wind conditions reach a threshold level or exceed such, that the awning be retracted so that the high wind condition does not cause damage to the awning assembly or potentially harm a person who may be in the vicinity of the awning assembly.

Another problem with sensing wind conditions is that it is highly desirable to measure the conditions at the awning or connected hardware. However, powering such device and sending a control signal to a controller or other such receiver becomes more difficult due to the moving and rolling function of the awning assembly and the canopy. Thus, powering the sensor and sending signals from the sensor back to a receiver or controller by way of wired connection is problematic in a high-cycle moving structure.

Accordingly, it would be desirable to overcome these and other issues with wind sensing devices in order to provide a wind sensor which will send a signal to a receiver to retract an awning when a wind condition meets or exceeds a predetermined threshold. It would also be desirable to overcome the problems associated with requiring wired connections along the moving or rotating parts of the awning assembly while still positioning a sensor on the moving or rotating parts of the awning assembly.

The information included in this Background section of the specification, including any references cited herein and any description or discussion thereof, is included for technical reference purposes only and is not to be regarded subject matter by which the scope of the invention is to be bound.

SUMMARY

According to some embodiments, an energy harvesting wind sensor is provided for an awning assembly. The device is self-powering in that energy is converted from wind to electrical in order to power the sensor and a transmitter which signals a receiver to retract the awning assembly if a preselected threshold is met or exceeded. Since the system converts wind energy to electrical energy, wiring is not needed to extend along the moving or rotating parts of the awning assembly.

According to some embodiments, an energy harvesting wind sensor comprises an enclosure, a first coil and a second coil disposed within the enclosure, a magnet disposed between the first coil and the second coil, the magnet in cantilevered arrangement in the enclosure, a capacitor in electrical communication with the coils or the magnet, one of the magnet and the first and second coils being movable relative to the other, the enclosure configured to be mounted to an awning assembly and, a transmitter in electrical communication with the capacitor, the transmitter signals a receiver when a threshold value is met indicating a high wind or vibration condition is present.

Optionally, the receiver is remotely located. The energy harvesting wind sensor may further comprise a fixture. The energy harvesting wind sensor may further comprise a rod extending from the fixture. The rod may be substantially cantilevered from the fixture and the magnet may be disposed on the rod. The first coil and the second coil may be positioned adjacent to the magnet. The magnet may move in at least one dimension relative to the coils. The transmitter may be energized by the capacitor. The transmitter may transmit a signal upon a threshold level of capacitor charging. The receiver may be electrically connected to a switch, wherein the switch is capable of controlling extension or retraction of the awning. The energy harvesting wind sensor may further comprise a by-pass switch to disable the wind sensor.

According to other embodiments, an energy harvesting wind sensor comprises an awning including hardware arms, an awning roller and a canopy, an enclosure disposed on one of the hardware arms, the awning roller or the canopy, the enclosure having a fixture including positioning for one of a magnet and first and second coils, the fixture having the one of a magnet and first and second coils movably mounted relative to the other of the magnet and first and second coils, a capacitor in electrical communication and charging when the magnet or the first and second coils move, a transmitter which transmits a signal when the canopy is in an extended position and a threshold value is met indicating high wind condition.

Optionally, the signal indicating a wind level is such that the canopy should be retracted. The fixture comprising a first wall and a second wall. The energy harvesting wind sensor may further comprise a rod extending between the first and second walls. The energy harvesting wind sensor may further comprising a current rectifier disposed between the coils and the capacitor. The energy harvesting wind sensor may further comprising a current sensor in electrical communication with the coils.

According to other embodiments, an energy harvesting wind sensor may comprise a magnet and first and second coils. One of the magnet and the coils may be movable relative to the other of the magnet and the coils when blown by a wind. A capacitor in electrical communication with one of the coils or the magnet, and a transmitter which is in electrical communication with the capacitor. The capacitor may power the transmitter to send a wireless signal when a threshold value is met.

All of the above outlined features are to be understood as exemplary only and many more features and objectives of an energy harvesting wind sensor may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the energy harvesting wind sensor will now be described by way of examples. These embodiments are not to limit the scope of the claims as other embodiments of the energy harvesting wind sensor will become apparent to one having ordinary skill in the art upon reading the instant description. Non-limiting examples of the present embodiments are shown in figures wherein:

DETAILED DESCRIPTION

Figure 1:
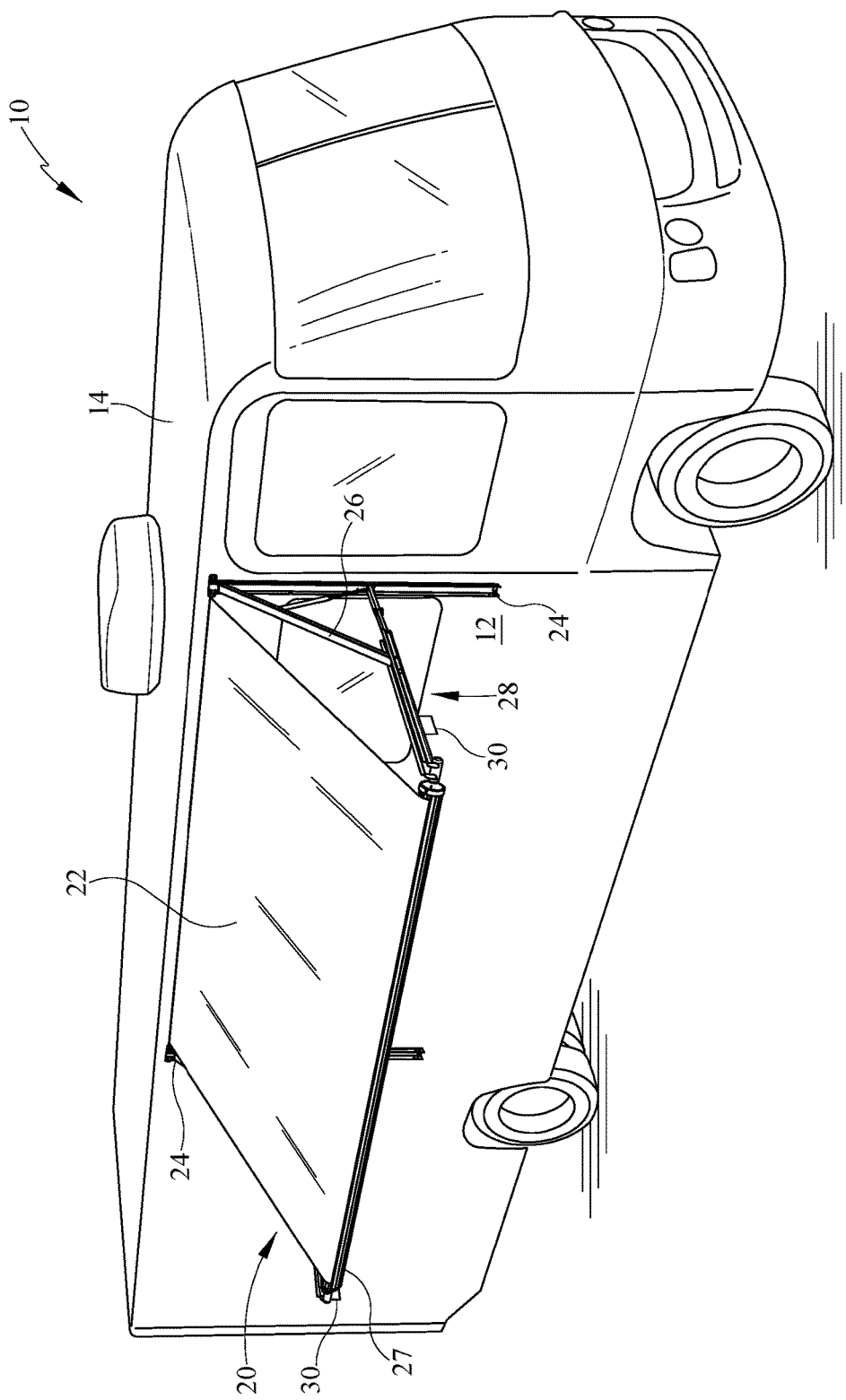
FIG. 1 is a perspective view of a recreational vehicle (RV) with a sensor located on the awning assembly and the awning assembly in an extended position.

It is to be understood that the energy harvesting wind sensor is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-8 various embodiments of an energy harvesting wind sensor. The assemblies utilize wind energy in the form of vibration and convert it to electricity by way of movement of one of a magnet and coil relative to the other of the magnet and coil. This induces current in the at least one coil which in turn charges a capacitor. The sensing of the capacitor charge over a preselected time or to a preselected threshold level, will result in powering of a transmitter and the transmitter transmitting a signal to a receiver which is remotely located. The receiver will then actuate a controller to retract the awning assembly if a threshold level is met. Since the device converts wind energy to electrical energy, power wires are not needed to run to the sensor enclosure. Further, since the device utilizes a wireless transmitter, the wires are also not needed to extend to the closure for sending signals from the wind sensor to a receiver. Therefore, this is advantageous since there is no wiring to be damaged due to movement and/or rotation of the awning assembly.

Referring now to FIG. 1, a perspective view of a recreational vehicle (RV) 10 is depicted. The exemplary RV includes a drive and a transmission, not shown, as well as at least one sidewall 12 and a roof 14. It should be understood that although an RV is referred to in the exemplary embodiments, one skilled in the art should understand that the use of the energy harvesting wind sensor is not limited to these drivable vehicles. The term "RV" is also meant to include towable structures, sometimes called campers, mobile homes, marine craft, commercial vehicles, agricultural vehicles, horse trailers, and temporary structures such as those used at sports events, (tailgating), flea markets. Further, the term "RV" may refer to fixed structures such as homes and other stationary structures all of which include canopy structures which may or may not be retractable. All of these structures are considered to be usable with the energy harvesting wind sensors of the present embodiments.

An awning assembly 20 is connected to the sidewall 12 and/or the roof 14 of the vehicle 10. In further embodiments, the awning assembly 20 may be retractable within the sidewall 12 so as to reduce the airflow interference of the assembly while the vehicle 10 is being operated.

The awning assembly 20 includes an awning or canopy 22 and hardware assembly 28 defined by at least one first arm 24 and at least one second arm 26. The awning hardware assembly 28 which is utilized according to the instant embodiment to connect the awning assembly 20 to the sidewall 12 of the vehicle 10. The hardware assembly 28 allows for support of the canopy 22 in an extended position (shown) or in a retracted position. The awning assembly 20 is exemplary and other variations may be utilized. For example, a four bar hardware linkage may be used for extension and retraction of the awning assembly, as shown. However, it is also within the scope of the instant embodiments that a cassette awning assembly may be utilized, which would utilize an alternative hardware assembly. Still further hardware arrangements may be used to extend or retract the assembly 20 and support such extended position. Also, the roller tube assembly may be movable as shown, or may be fixed to the sidewall 12 and rotatable.

The depicted awning assembly 20 further includes a roller tube 27 which moves inwardly and outwardly with corresponding retraction or extension of the canopy 22 to provide the sheltered or shaded area beneath the awning assembly 20. The awning assembly 20 may be an automated system such as by electrical, air, hydraulic or other fluid power systems to cause extension or retraction of the canopy 22. In other embodiments, the awning assembly may be, for example, a cassette-type wherein a roller tube is disposed at a sidewall and rolls to extend or retract the awning but does not move with the hardware.

Also shown in FIG. 1 is an energy harvesting wind sensor 30. While the term wind sensor is used, it may also be described as a vibration sensor because vibration of the awning assembly 20 causes the operation of the device. In other words, the wind level might be high, but when the awning is retracted, the vibration may be so low that the wind sensor 30 does not operate. While alternatively, the operation of the wind sensor 30 is started due to vibration, for example by wind, other environmental conditions may also cause vibration and therefore the embodiments are not limited to wind. According to the instant embodiment, the wind sensor 30 can be located in various locations of the awning assembly 20. In one embodiment, the wind sensor 30 is located on the hardware assembly 28. In another embodiment, the wind sensor 30 may be located on the roller tube 27 or a connector between the roller tube 27 and the hardware assembly 28. In other embodiments, multiple sensors 30 may be utilized to cause a switch or other controller to close the awning assembly 20.

The wind sensor 30 vibrates or oscillates due to wind energy and may signal when there is a potential for damage to the awning assembly 20 when in the extended position. The wind sensor 30 then converts that wind energy to electrical energy to signal a receiver 96 or switch 92 (FIG. 7) to retract the awning assembly 20 when wind conditions warrant retraction.

Still further, the wind sensor 30 does not require batteries or a wired power supply to extend to the enclosure. Instead, the sensor converts wind energy to vibration which is then converted to electricity. Thus the sensor creates the power to produce a signal which directs retraction of the awning assembly 20 if the wind level is too high. This may be monitored such that a determination is made that wind level is too high, or more simply when a wind level being high enough to start operation of the wind sensor 30. However, in some embodiments, a battery or capacitor may be used to store electrical energy.

Figure 2:
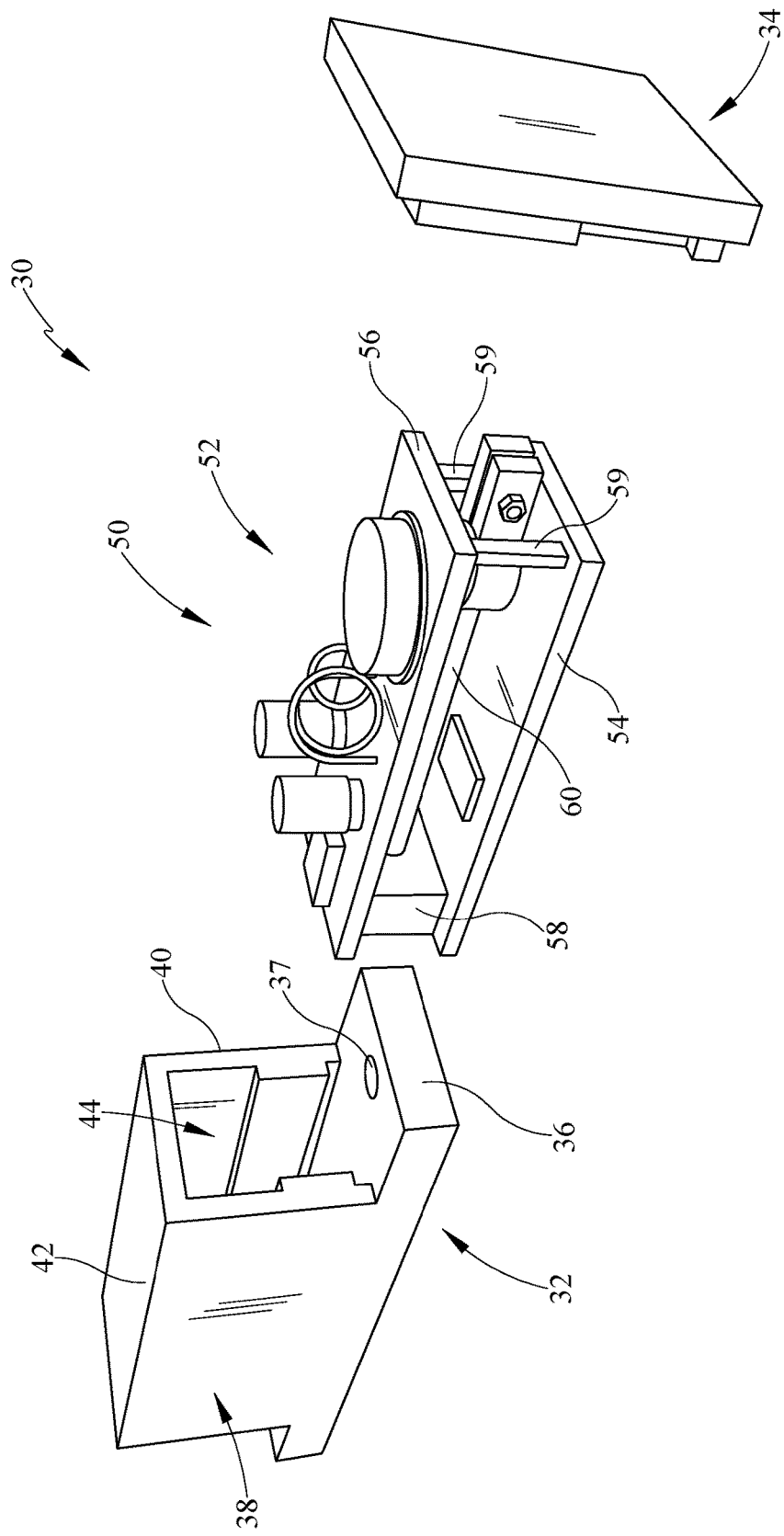
FIG. 2 is an exploded perspective view one embodiment of an energy harvesting wind sensor.

Referring now to FIG. 2, an exploded perspective view of the wind harvesting energy sensor 30 is depicted. The depicted embodiment is merely one example and other structures may be used to provide the functionality. The wind harvesting energy sensor 30 may include an enclosure 32 which may include at least one enclosure cap 34. The enclosure 32 is desirably sealed in some embodiments in order to prevent environmental contaminants, such as rain, snow, dust, etc. from entering and damaging internal components. The enclosure 32 may comprise a base 36 which may be mounted to the awning assembly 20 at the hardware assembly 28 or the awning roller tube 27 (FIG. 1). It may be desirable in some instances to position the enclosure 32 on the hardware assembly 28 since that position may be a better predictor of damage, when extended. The base 36 may include one or more apertures 37 which allow for connection of the enclosure 32 to the awning assembly 20. Alternatively, various mounting structures may be connected to the base 36 or formed thereon so as to allow for connection of the enclosure 32 to the awning assembly 20 in various forms. Still further, the enclosure 32 may also be formed on the awning assembly 20 at some location so that the internal components of the wind sensor 30 may be added thereto. Thus, the enclosure 32 may be formed integrally or may be a separate structure from the awning assembly 20.

Extending upwardly from the base 36 are first and second walls 38, 40. A cover 42 may connect the walls 38, 40 to provide three sides of cover for the wind sensor 30. Although not shown in the view, a rear wall may also be utilized to enclose a space 44 within the walls 38, 40 in between the base 36 and top 42. In the present embodiment, the enclosure cap 34 provides the final wall of the enclosure 32 and may be snap-fit, fastened, glued or otherwise positioned to completely enclose space 44 once the components of the wind sensor 30 are placed within the enclosure 32. The enclosure 32 may be formed of various materials and may be formed in various shapes. The interior of the enclosure 32 is generally hollow.

The wind sensor 30 also comprises a plurality of electrical and/or electromechanical components 50 which convert the wind energy to electricity and signal a receiver that the awning assembly 20 should be retracted in high wind conditions. The electromechanical components 50 are shown between the enclosure 32 and the enclosure cap 34. The electromechanical components 50 may take various forms and one embodiment is described as exemplary but one skilled in the art should realize that the specific structures may be altered in order to provide the conversion of wind energy into electrical energy. The electromechanical components 50 of the enclosure 32 include a fixture 52 comprising a first wall 54 and a second wall 56. In the embodiment depicted in FIG. 2, the first wall 54 is shown positioned beneath the second wall 56. However, this is merely one orientation that may be utilized and one skilled in the art should be aware that the first wall and second wall 54, 56 may be represented by planes that are vertically oriented rather than horizontally oriented in alternate embodiments. Still further, the enclosure 32 is shown such that the first and second walls 54, 56 are in the flat or horizontal orientation. However, it may be that the enclosure 32 is mounted such that the base 36 is not horizontal but instead mounted on a vertical surface which therefore, would change the orientation of the first and second walls 54, 56 from horizontal to vertical.

The first and second walls 54, 56 may be formed of various materials including, but not limited to, printed circuit boards which may be used to provide electrical connection or electrical communication between the various structures of the fixture 52. Alternatively, the first and second walls 54, 56 may be formed of a plastic material and the electrical components may be connected by wire connection extending therebetween rather than the printed circuit board shown or in further alternatively, depositing conductive material on the walls 54, 56. And still in further alternatives, a metallic or other conductive material may be used wherein a shielding material may be coating or covering the metallic material and trace electrical conductors be provided by removing some shielding in order to connect electrical components of the fixture 52.

Extending between the first and second walls 54, 56 is a support 58. The support 58 separates the first and second walls 54, 56 at one end. At the opposite end of the fixture 52 may be one or more support columns 59. These structures may be used to separate the first and second walls 54, 56. However, these are merely exemplary embodiments and alternate structures may be utilized to separate the walls 54, 56.

The support 58 provides a further functionality of supporting a rod 60. The rod 60 is extending from the support 58 in a cantilevered fashion so that the rod 60 may oscillate or vibrate toward the opposite end of fixture 52 near the columns 59. The rod 60 may allow some oscillating and therefore should be formed of a material which will accommodate such motion.

During operation, the rod 60 may vibrate or oscillate causing movement in one or more dimensions between the first wall 54 and the second wall 56. While the rod 60 is shown to provide movement, it is possible that other structures may be utilized. For example, an elastic spring arm may be utilized or other structure which allows for vibration and movement of one part relative to the other portions of the fixture 52. Thus, the rod 60 is not the only embodiment considered to be within the scope of the instant disclosure. Instead, additional embodiments may be utilized.

Figure 3:
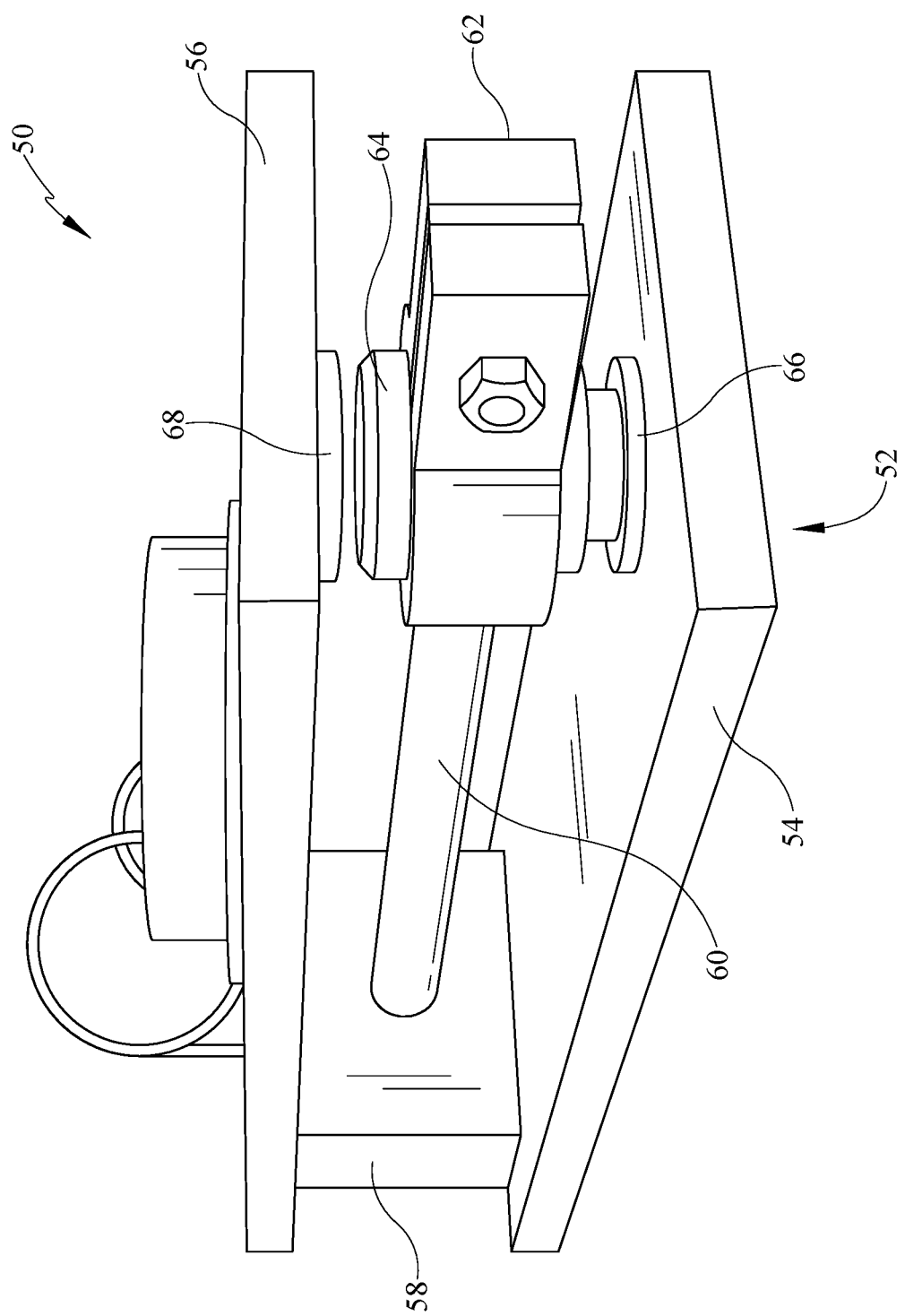
FIG. 3 is an assembled perspective view of the exemplary energy harvesting wind sensor of FIG. 2.

With reference now to FIG. 3, a perspective view of an assembled fixture 52 is shown. In the embodiment, the first wall 54 and the second wall 56 are again oriented to be generally horizontal but such orientation is not limiting as the first and second walls 54, 56 may alternatively be vertically oriented during operation. At the rear end of the depicted orientation, the support 58 is shown separating the first and second walls 54, 56. The rod 60 extends from the support 58 toward the opposite end of the first and second walls 54, 56. It may be noted also that the depicted embodiment does not utilize the columns 59 as they are an optional feature part of the electromechanical components 50 including the fixture 52.

In this depiction, a magnet 64 is shown positioned on the rod 60. The magnet 64 moves in one or more dimensions between the first and second walls 54, 56 and with the movement of the rod 60. The magnet 64 may be connected to the rod 60 in various fashions. In the depicted embodiment, a clamp structure 62 is formed such that a fastener may be tightened to clamp the magnet in place. However, this is merely one embodiment. Other embodiments may include a molded structure wherein the magnet 64 may be positioned and held by friction fit or by adhesive. Still other embodiments may be utilized as well such that the magnet 64 is capable of moving with the rod 60.

Also shown in the embodiment, are first and second coils 66, 68. The first and second coils 66, 68 are positioned opposite the magnet 64 and are fixed in the first and second walls 54, 56 respectively. Vibration of the rod 60 and the magnet 64 therefore allows for movement relative to the coils 66, 68 and induces a current due to the movement of the magnet 64 relative to the coils 66, 68.

It should also be noted that while this embodiment depicts the magnet which moves relative to the coils 66, 68, in alternate embodiments, it may be possible to move the coils 66, 68 on the rod 60 relative to stationary magnets.

Figure 4:
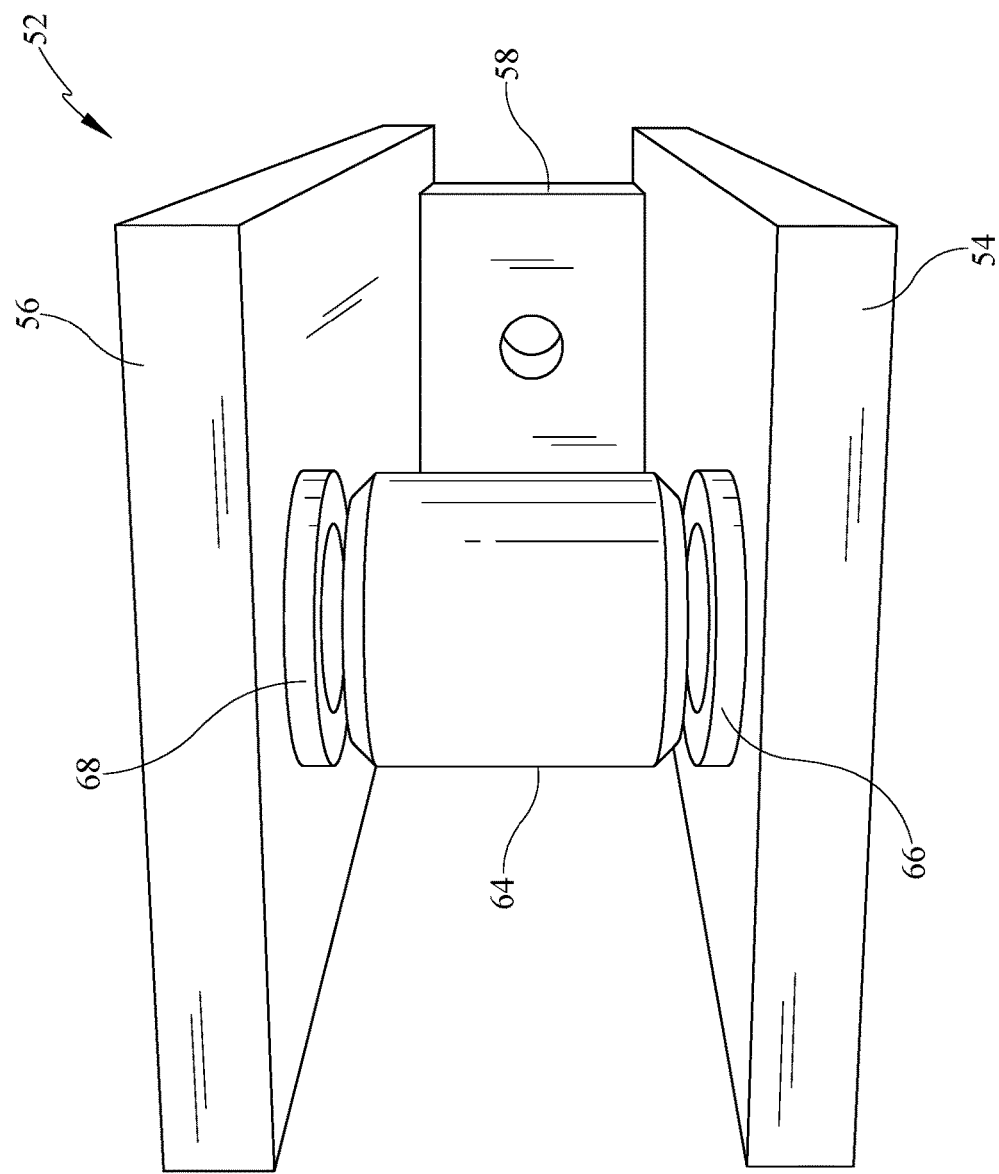
FIG. 4. is a perspective view of the magnet and coils in a centered position.
Figure 5:
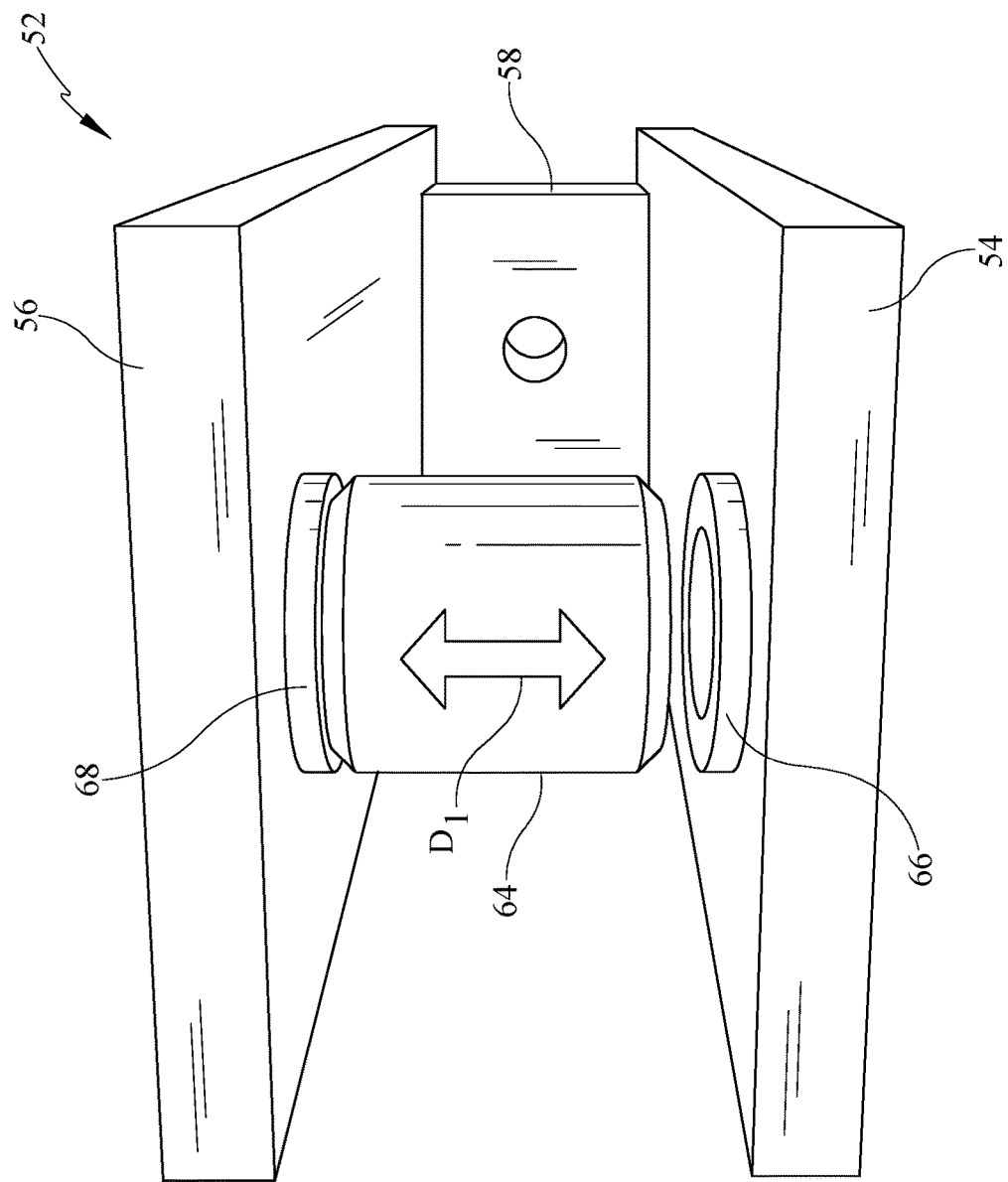
FIG. 5 is a perspective view of a magnet and coils which convert wind energy to electrical energy and show it depicting movement of a magnet in a first dimension.

Referring now to FIG. 4, a perspective view of the fixture 52 is shown including the first wall 54, second wall 56 and support 58 at the rear of the depicted structure. The rod 60 is removed from this view simply for clarity. The magnet 64 is shown centered between the first and second coils 66, 68. This is the normal, resting position when there is no vibration occurring.

With reference to FIG. 5, the embodiment is again depicted with a double-headed arrow D1 which represents movement of the magnet 64 in a first dimension. The magnet 64 is shown closer to the coil 68 and further from the coil 66. The magnet 64 will oscillate in this dimension back and forth between the coils 66, 68 to induce a current.

Figure 6:
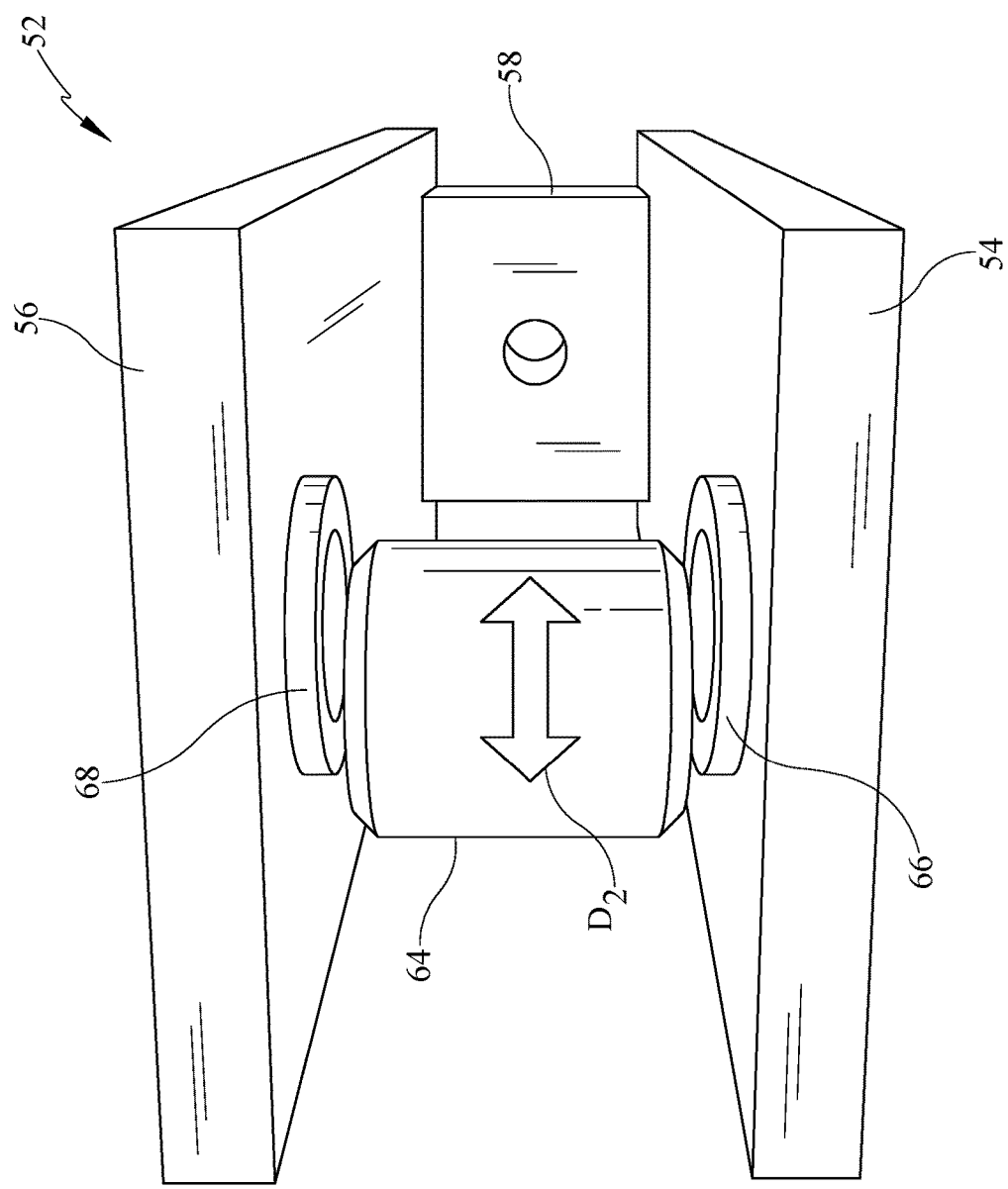
FIG. 6 is a perspective view of the magnet and coils depicting movement in a second alternate dimension relative to FIG. 5.

With reference now to FIG. 6, an alternate motion is shown for the magnet 64. In this embodiment, the magnet 64 is moving left to right rather than vertically and this is represented by a double-headed arrow D2 to represent the horizontal movement of the magnet 64 between the coils 66, 68. Thus, it should be noted that the magnet 64 may have at least one motion but in some embodiments, may have two dimensions of movement and the movement dimension of the magnet 64 may be affected by the mounting orientation of the fixture 52 or the freedom to operate of the rod 60 or other structure which allows for the oscillation of the magnet 64 or the coils 66, 68.

Figure 7:
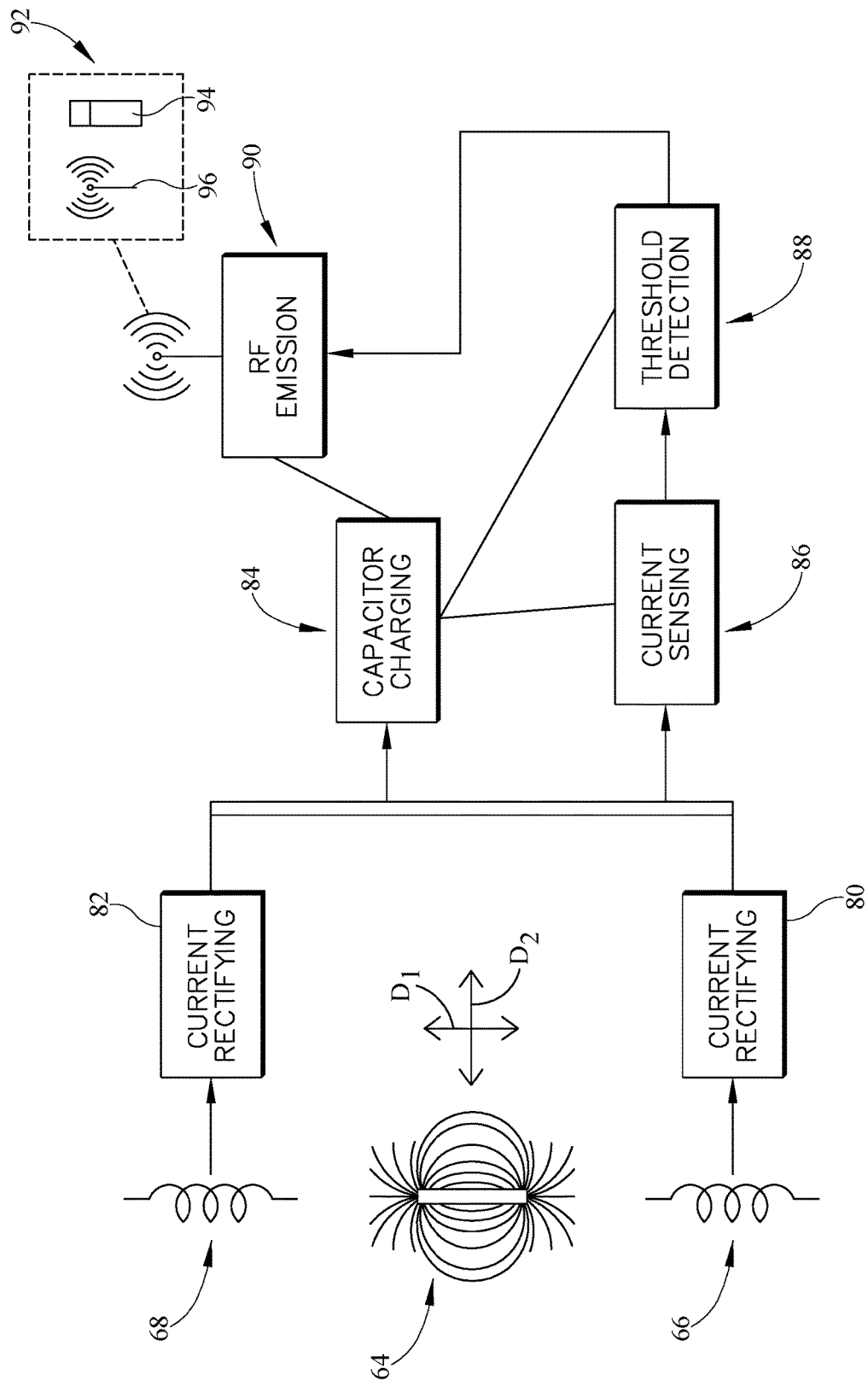
FIG. 7 is a schematic diagram of the energy harvesting wind sensor of the instant embodiment.

Referring now to FIG. 7, a block diagram is depicted which represents a schematic view of the function of the instant embodiment. Starting from the left side of the figure, the first coil 66 and second coil 68 are shown opposite to the magnet 64. The two dimensions of movement D1, D2 are depicted as double-headed arrows. These show at least two dimensions through which the magnet 64 may move. Each of the coils 66, 68 is in electrical communication with a current rectifier 80, 82. The rectifier 80, 82 converts alternating current to direct current for further charging of the capacitor 84.

After rectifying the current, the electricity moves to a capacitor 84 in order to charge the capacitor. Additionally, the current may pass through a current sensor 86 and also a threshold detector 88. In some embodiments, as the capacitor 84 is charged, the current is being sensed and the threshold detector 88 determines when the minimum current or other electrical measure is reached. When the threshold value, e.g. voltage, current, is reached, the capacitor 84 is allowed to power a transmitter 90. The transmitter 90 sends a signal to a remote switching structure 92 which receives a signal and may make a determination as to how to proceed. For example, if a threshold level of current has been reached or a threshold amount of oscillation is detected, the transmitter 90 can signal the switching mechanism 92 and the switching mechanism 92 may cause an awning motor to retract the awning assembly 20 (FIG. 1). The switching mechanism 92 may have a manual switch 94 to extend or retract the awning assembly 20 (FIG. 1). Additionally, the switching mechanism 92 may also have a receiver 96 which receives the wireless transmission from the transmitter 90. This is represented by broken line extending between the transmitter 90 and the receiver 96.

The transmitter 90 may be formed of a radio frequency (RF) type, may be infrared (IR), may have Bluetooth signal transmission or some known wireless standard, such as wi-fi 802.11x. Further, the transmission may also be encoded so that false triggering is not triggered by other devices in the vicinity. This might be problematic at RV camp sites, for example. The transmitter 90 may signal an encoded transmission, for example having 16-bit encryption, however other levels of encryption may be utilized.

The wireless nature of the instant embodiment is advantageous for a number of reasons. First, as previously mentioned, one or more sensors 30 may be utilized to improve the accuracy or locate in different dimensions, as wind may blow in differing directions to cause some but not all portions of the awning assembly 20 to vibrate. Second, the wireless functionality facilitates use of the systems without requiring control cabling or wiring. This is advantageous since the awning must move between the retracted and extended positions.

Figure 8:
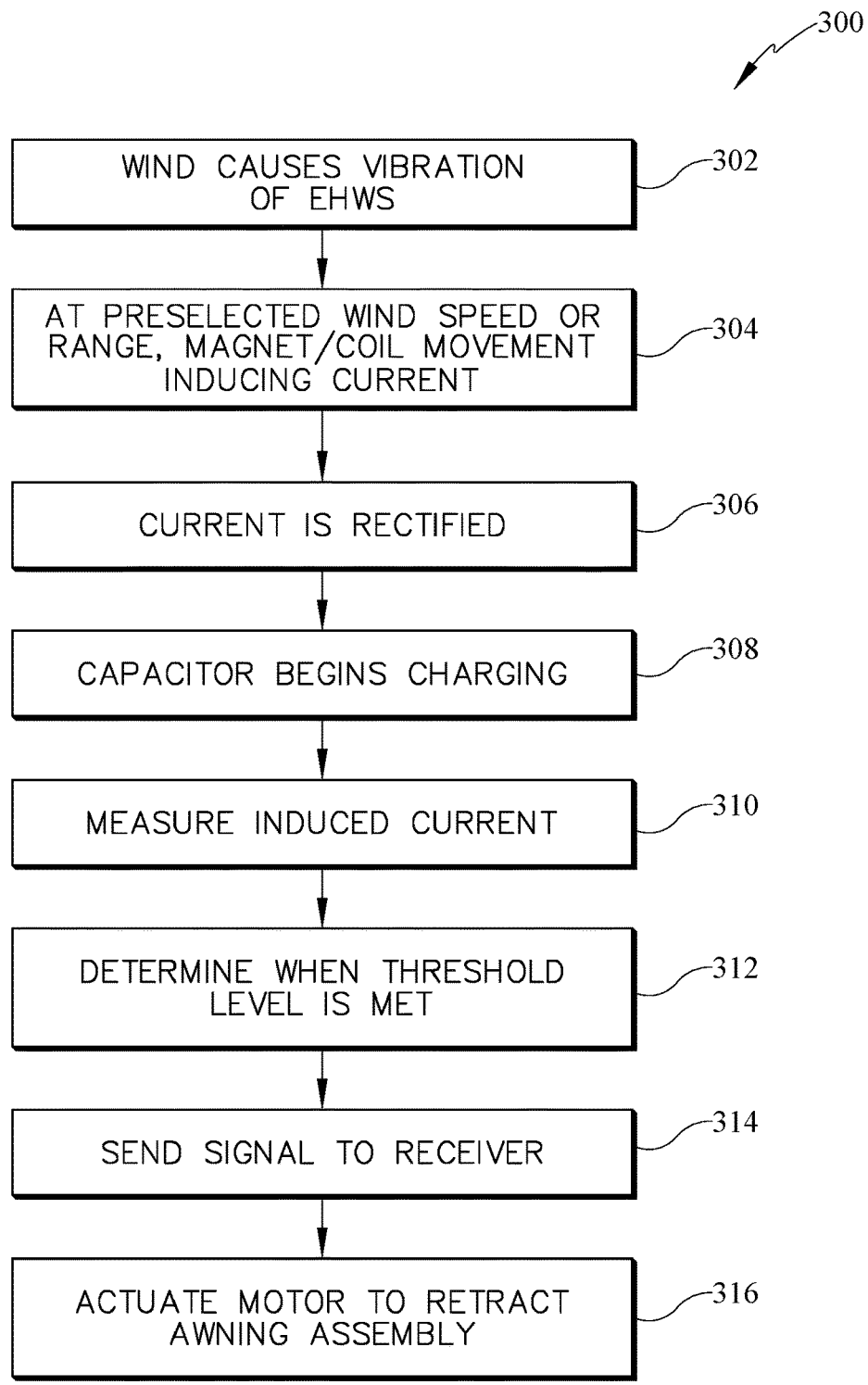
FIG. 8 is a flow chart depicting the process of operation utilized by the energy harvesting wind sensor.

Referring now to FIG. 8, a flow chart is depicted comprising various steps of the process 300 utilized by the wind sensor 30. To begin the process, the wind or other environmental condition should cause vibration of the wind sensor 30. This is indicated at step 302.

At a preselected wind speed or range of wind speed, indicated at step 304, one of the magnet 64 or the coil 66, 68 begins moving which induces current due to the relative motion between the magnet 64 and the coils 66, 68. As indicated previously, the magnet 64 may be moved relative to the coils 66, 68, or the coils 66, 68 may be moved relative to a stationary magnet 64.

When the movement of either the magnet or the coils begins inducing a current, the current is next rectified at step 306. The rectified current at step 306 begins charging the capacitor 84 at step 308.

While the charging is occurring, or separately, the induced current is being measured at step 310. This may occur by measuring current at the capacitor 84. Alternatively, this may occur by measuring current which is at the rectifier 80, 82. In either embodiment, the measure of current may occur in combination with a timing circuit. If desirable to monitor the duration of time of which the charging begins, a timing circuit may also be implemented.

As the charging and the measuring of the induced current continue, a determination is made of when a threshold level is met. The threshold level may be measured as one or more characteristics. For example, in some embodiments, the factor may be current. If the current continues being created for a specific amount of time, or the current continues being stored for a preselected amount of time, the wind sensor 30 may monitor such current or time to determine if a threshold is met. Still further, the wind sensor 30 may monitor voltage in the capacitor 84. In a further embodiment, the wind sensor 30 may only determine if a period of time of charging is met. For example, if the charging is occurring for a preselected period of time, then the assumption may be made that the wind level is high enough to cause such charging and therefore that the system needs charging. Still further, other characteristics may be monitored. Further, the characteristics may be monitored at one or more locations within the circuitry of the wind sensor 30 for example at the rectifier 80, 82, at the capacitor 84 or at another location and/or in combination with another characteristic, such as time.

In one embodiment, the capacitor 84 may reach a threshold limit at step 312. Once the threshold level is reached, the sensor sends a signal at step 314 from the transmitter 90 to the awning switch 92. The switch 92 may comprise a manual switch 94 for a user to deploy the awning assembly 20 and may also include a receiver 96. The receiver 96 receives the signal sent from the transmitter 90 at step 314.

The transmitter 90 may be designed to send a signal continuously once a desired level of charge is reached. This may require the switch 92 to have a circuit which monitors the signal and determines if a value is high enough to require closure of the awning assembly 20. Alternatively, the transmitter 90 may be designed to send a signal only when a threshold level is met indicating the wind level is high enough to warrant closure of the awning assembly 20. In still a further embodiment, the determining step of 312 may be that when the power level is high enough to transmit, the transmitter 90 does such transmitting. The circuitry of the wind sensor 30 may be designed such that the power level may be related to a condition when winds are high enough to warrant such transmission to the receiver 96 or the wind sensor 30. The switch 92 may include determining circuitry which sends a first signal if winds levels are high enough or a second signal if wind levels do not warrant closure of the awning assembly 20.

At step 316, the motor may be actuated to retract the awning assembly. This may be directly as a result of the signal transmitted at step 314 or may be indirectly, for example due to a decision based on the signal transmitted. The switch 92 therefore may cause the actuation automatically due to the wind conditions being at a specific level or within a range at a specific time or within a time period.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. An energy harvesting wind sensor, comprising:
   an enclosure;
   a first coil and a second coil disposed within said enclosure;
   a magnet disposed between said first coil and said second coil, said magnet in cantilevered arrangement in said enclosure;
   a capacitor in electrical communication with said coils or said magnet;
   one of said magnet and said first and second coils being movable relative to the other;
   said enclosure configured to be mounted to an awning assembly;
   a transmitter in electrical communication with said capacitor, said transmitter signals a receiver when a threshold value is met indicating a high wind or vibration condition is present.

2. The energy harvesting wind sensor of claim 1 wherein said receiver is remotely located.

3. The energy harvesting wind sensor of claim 1 further comprising a fixture.

4. The energy harvesting wind sensor of claim 2 further comprising a rod extending from a fixture.

5. The energy harvesting wind sensor of claim 4, said rod being cantilevered from said fixture.

6. The energy harvesting wind sensor of claim 4, said magnet disposed on said rod.

7. The energy harvesting wind sensor of claim 6 wherein said first coil and said second coil are positioned adjacent to said magnet.

8. The energy harvesting wind sensor of claim 7, wherein said magnet is configured to move in at least one dimension relative to said coils.

9. The energy harvesting wind sensor of claim 8 wherein said transmitter is energized by said capacitor.

10. The energy harvesting wind sensor of claim 9, wherein said transmitter transmits a signal upon a threshold level of capacitor charging.

11. The energy harvesting wind sensor of claim 2, wherein said receiver is electrically connected to a switch, and further wherein said switch controls extension or retraction of said awning.

12. The energy harvesting wind sensor of claim 11 further comprising a by-pass switch to disable said wind sensor.

13. An energy harvesting wind sensor, comprising:
    an awning including hardware arms, an awning roller and a canopy;
    an enclosure disposed on one of said hardware arms, said awning roller or said canopy;
    said enclosure having a fixture including positioning for one of a magnet and first and second coils;
    said fixture having said one of a magnet and first and second coils movably mounted relative to the other of said magnet and first and second coils;
    a capacitor in electrical communication and charging when said magnet or said first and second coils move;
    a transmitter which transmits a signal when said canopy is in an extended position and a threshold value is met indicating high wind condition.

14. The energy harvesting wind sensor of claim 13, said signal indicating a wind level is such that said canopy should be retracted.

15. The energy harvesting wind sensor of claim 13, said fixture comprising a first wall and a second wall.

16. The energy harvesting wind sensor of claim 15 further comprising a rod extending between said first and second walls.

17. The energy harvesting wind sensor of claim 15 further comprising a current rectifier disposed between said coils and said capacitor.

18. The energy harvesting wind sensor of claim 13, further comprising a current sensor in electrical communication with the coils.

19. An energy harvesting wind sensor, comprising:
    a magnet and first and second coils, one of said magnet and said coils being movable relative to the other of said magnet and said coils when blown by a wind;
    a capacitor in electrical communication with one of said coils or said magnet;
    a transmitter which is in electrical communication with said capacitor, said capacitor powering said transmitter to send a wireless signal when a threshold value is met.

* * * * *